Feb. 12, 1946. C. P. YOUNG 2,394,832
COMBINATION WALL HOOK AND SOCKET
Filed Oct. 24, 1944 4 Sheets-Sheet 1
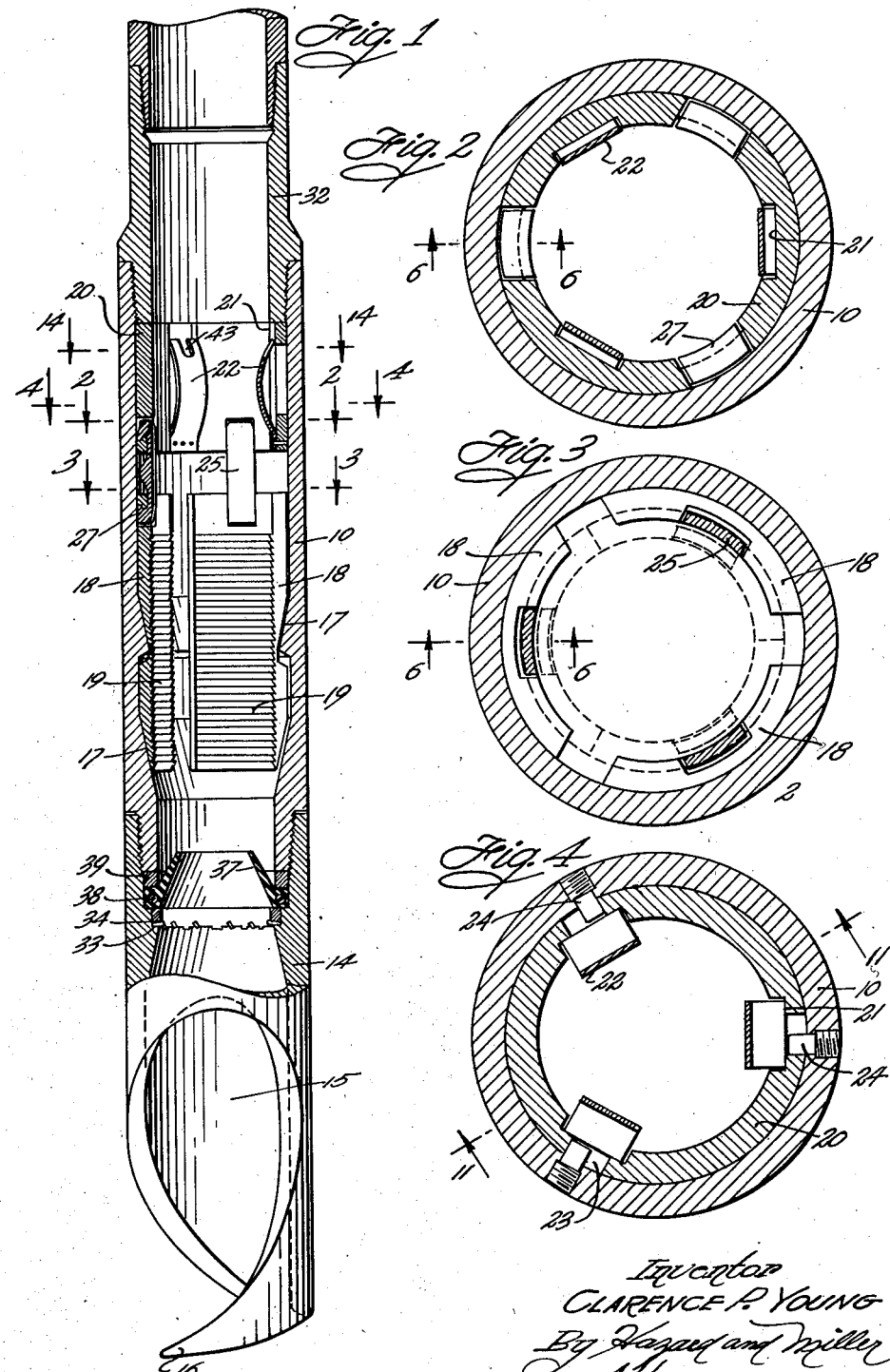

Feb. 12, 1946. C. P. YOUNG 2,394,832
COMBINATION WALL HOOK AND SOCKET
Filed Oct. 24, 1944 4 Sheets-Sheet 2
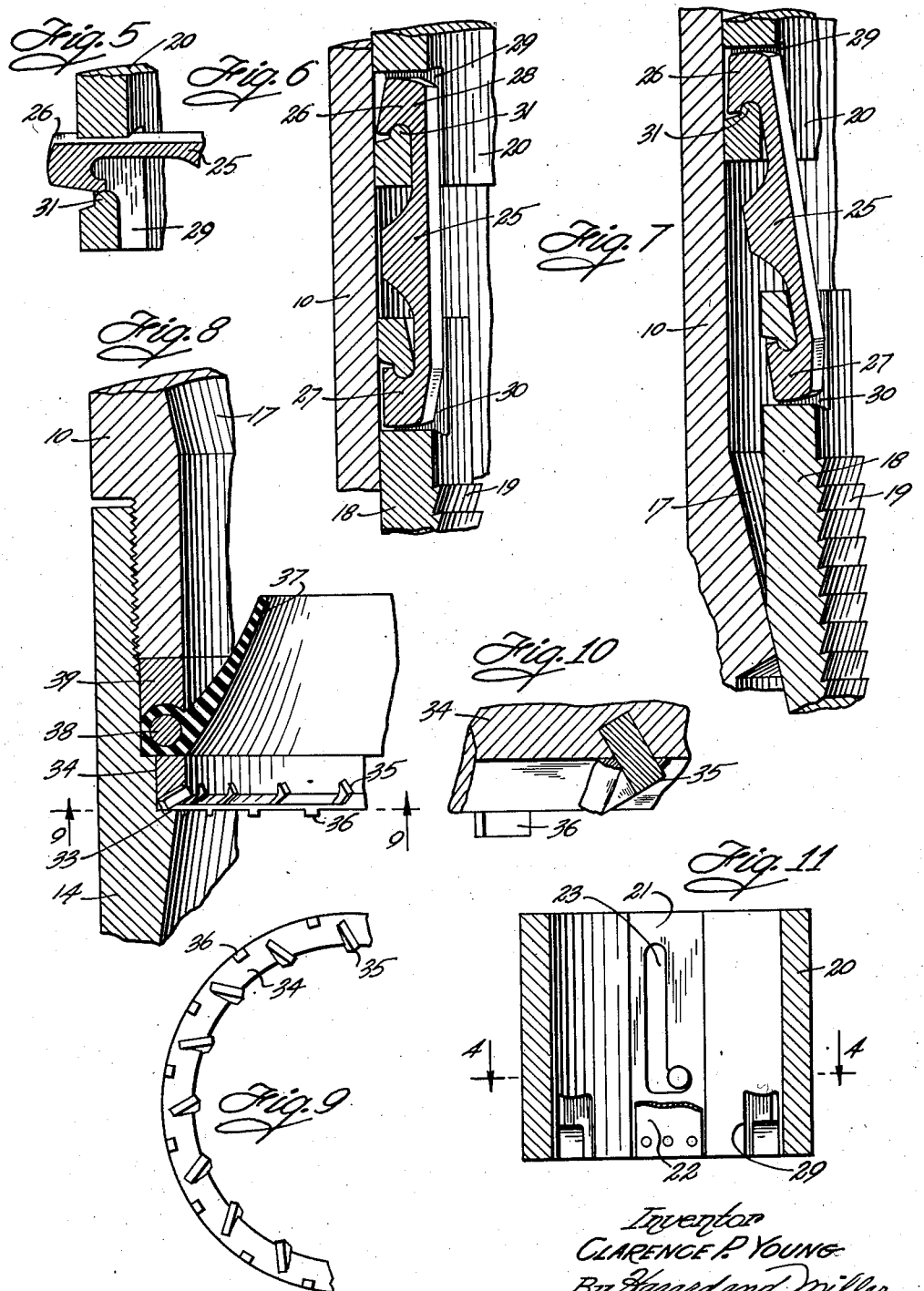
Inventor
CLARENCE P. YOUNG
By Hazard and Miller
Attorneys

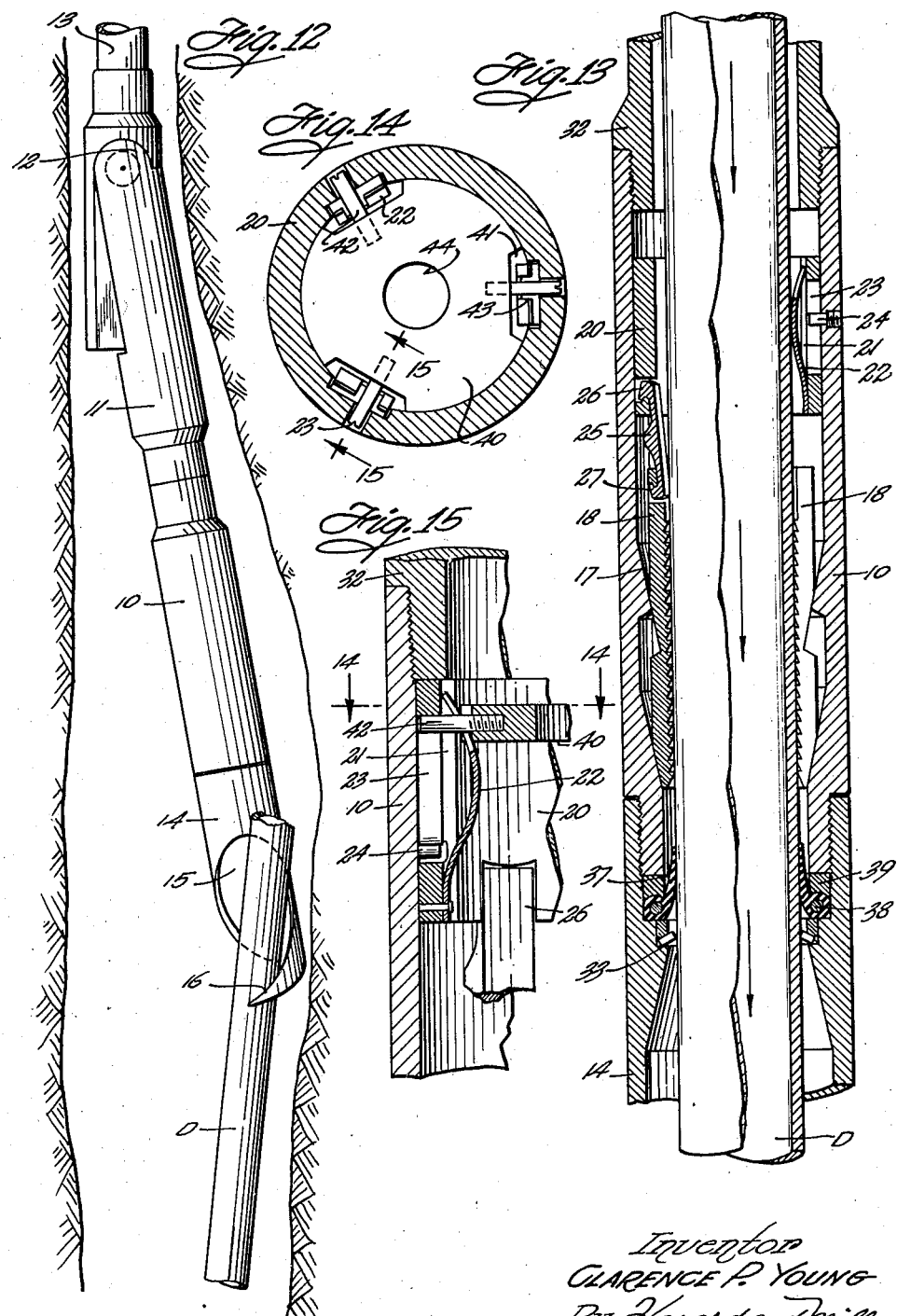

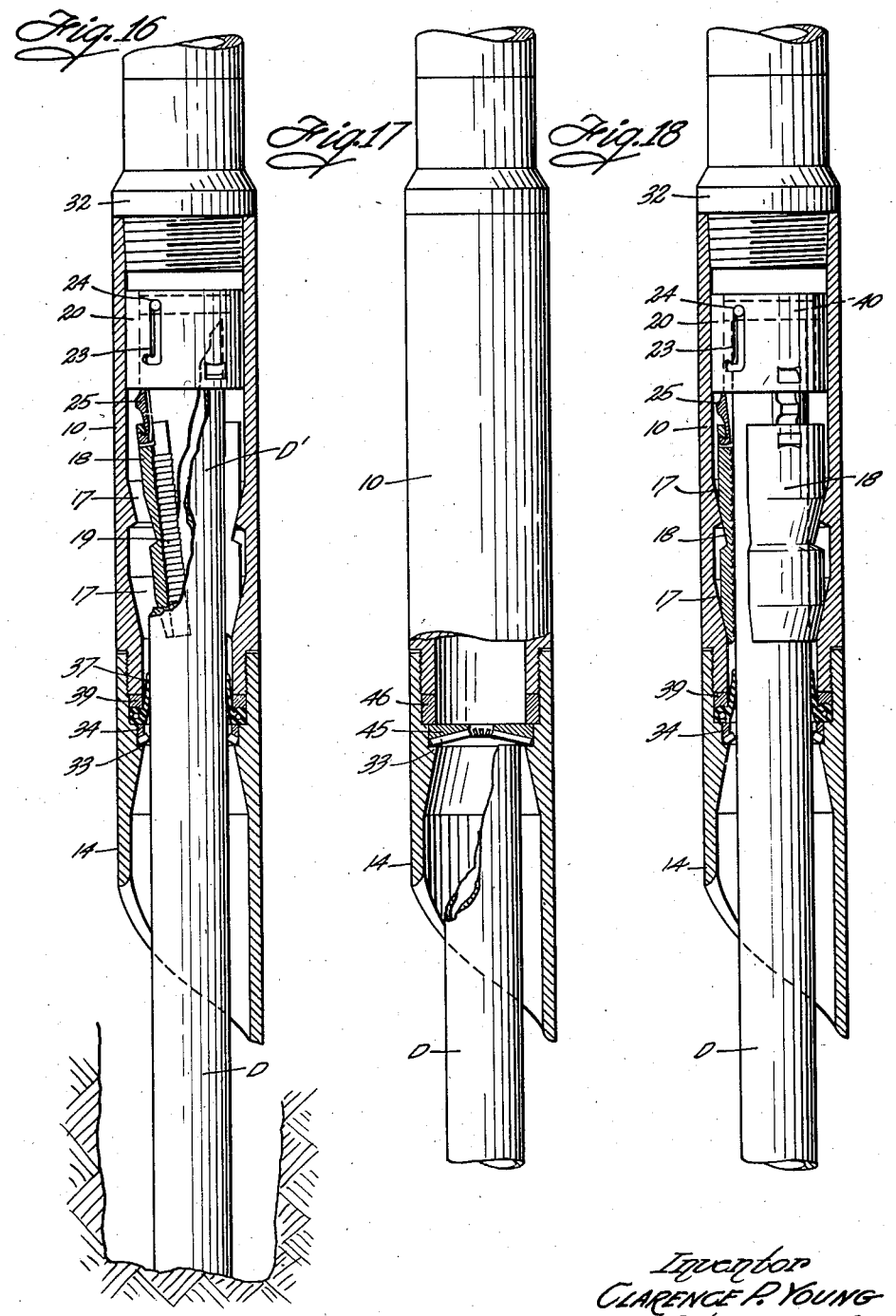

Patented Feb. 12, 1946

2,394,832

UNITED STATES PATENT OFFICE 2,394,832

COMBINATION WALL HOOK AND SOCKET

Clarence P. Young, Bellflower, Calif.

Application October 24, 1944, Serial No. 560,169

4 Claims. (Cl. 294—86)

This invention relates to improvements in fishing tools for use in wells and particularly to that class of fishing tools designed to recover lost strings of pipe and similar objects.

An object of the invention is to provide an improved fishing tool of the wall hook type which can be swung laterally by means of a hydraulic knuckle mounted on a run-in string of pipe to engage and straighten the fish in the well and thereafter be lowered over the fish to perform any one of a number of operations designed to bring about its recovery and removal from the well. These operations may include milling off a section of the fish; effecting a leakproof seal around the fish so that circulation fluid may be forced down through the fish; tightly gripping the fish by means of contractible slips so that the fish may be forcibly pulled upwardly or milling off the top of a jagged fish so that it may be gripped on all sides by the contractible slips.

Another object of the invention is to provide a fishing tool having a tubular body within which there are slipways and to provide a construction for suspending slips adjacent the slipways which is so designed that separation or loosening of parts of the tool while in the well is impossible as long as no parts may have become broken.

Another object of the invention is to provide a fishing tool having a tubular body with slipways on the interior thereof, and having a liner releasably held in uppermost position within the body and to provide a novel connector construction for connecting slips that are suspended adjacent the slipways from the liner, whereby the slips may be held in expanded or open position until intentionally released for contraction about the fish.

Still another object of the invention is to provide an improved fishing tool of the wall hook type which is so designed as to be quite versatile in its uses so as to satisfactorily take care of a variety of fish conditions that may be encountered in the drilling of wells.

With the foregoing and other objects in view which will be made manifest in the following detailed description and specifically pointed out in the appended claims, reference is had to the accompanying drawings for an illustrative embodiment of the invention, wherein, Fig. 1 is a vertical section through the improved fishing tool embodying the present invention, illustrating at the bottom thereof a wall hook, the major portion of which is shown in side elevation.

Fig. 2 is a horizontal section taken substantially upon the line 2—2 upon Fig. 1 in the direction indicated.

Figs. 3 and 4 are horizontal sections taken substantially upon the lines 3—3 and 4—4 respectively upon Fig. 1 in the direction indicated.

Fig. 5 is a partial view in vertical section illustrating the manner in which the novel connectors embodying one feature of the present invention may be assembled with the liner.

Fig. 6 is a partial view in vertical section similar to Fig. 5 but illustrating the connectors as having been assembled with the slips and the liner, this section having been taken substantially upon the line 6—6 upon Fig. 2.

Fig. 7 is a vertical section similar to Fig. 6 but illustrating the position assumed by the parts when the slips have been shifted into contracted or fish engaging position.

Fig. 8 is an enlarged partial vertical section illustrating the details of construction of the means for effecting a seal about the fish and the associated mill.

Fig. 9 is a horizontal section taken substantially upon the line 9—9 upon Fig. 8 in the direction indicated.

Fig. 10 is a partial vertical section through a portion of the milling tool.

Fig. 11 is a vertical section taken substantially upon the line 11—11 upon Fig. 4 in the direction indicated.

Fig. 12 is a sectional view through a well illustrating the manner in which the improved fishing tool is initially caused to engage a fish in the well.

Fig. 13 is a vertical section through a portion of the fishing tool illustrating it in the position wherein the fishing tool has been lowered over the fish, the seal has been established thereabout and the slips have been caused to contract about the fish.

Fig. 14 is a horizontal section taken substantially upon the line 14—14 upon Fig. 1, but illustrating an accessory as having been applied to the fishing tool in order to meet certain conditions that may exist in the well.

Fig. 15 is a partial view in vertical section taken substantially upon the line 15—15 upon Fig. 14.

Figs. 16, 17 and 18 are sectional views illustrating the use of the tool upon a fish having a jagged upper end.

Referring to the accompanying drawings wherein similar reference characters designate similar parts throughout, the improved fishing tool comprises a tubular body 10 threaded at its upper end for attachment to the arm 11 (see Fig. 12) of a hydraulic knuckle generally indicated at 12 that is attached to a run-in string of pipe 13. The details of this hydraulic knuckle may vary and may if desired conform in construction to the disclosure made in my co-pending application Serial No. 560,167, filed October 24, 1944.

In so far as the present application is connected, the only requirements are that the run-in string 13 be equipped with an arm 11 that can be swung laterally with respect to the axis of the run-in string of pipe 13. Preferably this is performed hydraulically so that the arm is swung laterally when circulation fluid is pumped down through the run-in string of pipe. The lower end of the body is threaded for attachment thereto over a wall hook 14 which has an open side 15 adjacent the bottom of which there is a circumferentially extending finger 16. When the arm 11 is swung laterally as illustrated in Fig. 12, body 10 and the wall hook 14 are swung laterally so that the finger 16 is caused to sweep against the walls of the well when the run-in string of pipe 13 is rotated so as to engage a fish such as a lost string of drill pipe D that may be leaning in a cavity at one side of the well.

On the interior of the body there are formed downwardly and inwardly inclined slipways 17 and preferably there are upper and lower slipways for each slip, although such a construction is not essential to the present invention. Slips 18 have their backs formed complementary to these slipways so that as the slips descend relatively to the body 10 they will be caused to contract about the fish as illustrated in Figs. 7 and 13. These slips have upwardly directed teeth 19 formed on their interiors.

In the top of the body 10 there is provided a liner or internal sleeve 20. This sleeve has formed therein vertically extending internal grooves 21 within which are disposed inwardly bowed centering springs 22. These centering springs are secured to the liner or sleeve 20 adjacent their lower ends and when flattened outwardly will occupy a position wholly within the grooves 21. The centering springs overlie angular slots 23 (see Fig. 11) in the lines 20 at the backs of the grooves and studs 24 are threaded into the body and extend into these angular slots. In this manner a type of bayonet joint is provided between the body 10 and the liner 20 releasably holding the liner in its uppermost position relative to the body. The liner 20, however, may be released by reversely rotating the body 10 relatively to the liner when the friction or steering springs 22 are in engagement with fish. During such movement the studs 24 pass out of the lower horizontal portions of the angular slots 23 and may rise through the vertical portions thereof, thus permitting liner 20 to descend within the body. Whenever linear 20 descends within the body slips 18 are permitted to descend relatively thereto and to contract about the fish.

A feature of the invention resides in the novel manner by which the slips 18 are connected to the liner 20 so as to be suspended therefrom without danger of the slips becoming accidentally detached from the liner and lost in the well. To this end connectors 25 are employed having upper and lower hooked ends 26 and 27. It will be noted that these hooked ends have their crooks or flukes 28 (see Figs. 5, 6 and 7) quite heavy or thick. Slots 29 and 30 are formed in the bottom of the liner 20 and in the tops of the slips 18 respectively which receive these hooked ends. These slots are in height but slightly greater than the width of the hooked ends and but slightly greater than the thickness 28 of the crooks or flukes. The crotches of the hooks are receivable upon lips 31. By this type of construction the connectors may assume a vertical position suspending the slips within body 10 as shown in Fig. 6, or may swing inwardly as required when the slips descend on their slipways into the contracted positions illustrated in Fig. 7.

The construction is such that in order to assemble the device the connectors must be inserted through the slots 29 in the liner 20 in a substantially horizontal position as is illustrated in Fig. 5, wherein the thickened crooks or flukes are inserted through the slots and thereafter the connectors be permitted to swing downwardly to assume the vertical positions shown in Fig. 6. After the connectors and the liner 20 have been assembled the slips may be applied to the lower ends of the connectors. In so doing the slips must be first caused to assume substantially horizontal positions during which the lower hooked ends 27 of the connectors are inserted through their slots 30 and thereafter the slips may be allowed to swing vertically into the position shown in Fig. 6. The assembled liner connectors and slips may then be inserted bodily as a complete unit into body 10 after which the studs 24 are screwed through the body into the angular slots 23. This unitary assembly may then be locked within the body on screwing in the sub 32 that connects the body to the arm 11.

In the top of the wall hook there is a shoulder 33 adapted to receive an annular milling tool 34 having counters 35 welded or otherwise secured therein. This tool has on its undersurface boxes or projections 36 which fit into recesses formed on the shoulder 33 to hold the milling tool against rotation relative to the wall hook. Above the milling tool there is disposed a sealing member 37 which is a frusto-conical section of resilient rubber. The outer portion of this sealing member may be reinforced by an annular ring 38 and is clamped in position on top of the milling tool by a ring 39 which is tightened downwardly when the lower end of the body 10 is screwed into the wall hook.

The operation of the above described construction is as follows: When the tool is lowered into the well as illustrated in Fig. 12, circulation fluid is forced downwardly through the run-in string of pipe 13, causing the arm 11 to be swung laterally into engagement with the well walls and to encounter the fish D which may be leaning in a cavity in the well walls. After the fish has been engaged pressure within the run-in string of pipe 13 is released, allowing the arm 11 to return to vertical position. The pushing of the fish D around the well hole by the arm 11 and the subsequent allowing of the arm 11 to return to vertical position has a tendency to straighten the fish in the well hole. Thereafter the tool may be raised and lowered so that the tool will telescope over the fish and assume a position somewhat as is illustrated in Fig. 13. In this position it will be noted that the sealing member 37 serves to prevent escape of liquid downwardly around the outside of the fish. Circulation fluid may then be forced downwardly through the run-in string of pipe 13 and if the knuckle is constructed as disclosed in my co-pending application this circulation fluid will be forced downwardly through arm 11 and downwardly through the fish. Discharge of the circulation fluid from the bottom of the fish frequently is sufficient to loosen it so that it may be pulled out of the well by the run-in string of pipe. If this is believed possible, run-in string of pipe 13 is given a short reverse rotation so as to remove the studs 24 into the vertical portions of the slots 23, thus allowing the body 10 to be pulled upwardly relative to the liner 20. The slipways will then encounter the slips and move them inwardly into gripping engagement with the fish D as illustrated in Fig. 13 and if the fish has been loosened it may be recovered from the well in this manner. If it is found that the fish is immovably lodged in the well the run-in string of pipe 13 may be again lowered and rotated forwardly returning the slips to their expanded positions and locking the liner 20 in its uppermost position. The run-in string of pipe 13 may then be continuously rotated forwardly which causes the cutters 35 to cut the upper portion of the fish D from the lower portion and this severed portion can then be removed from the well and further milling operations be performed on the remainder of the fish that are in the well.

In some instances the fish D may have a jagged and tapering upper end D' as illustrated in Fig. 16. The condition of this upper end is normally ascertainable from that portion of the drill pipe that is recovered from the well after the test off or charting of the drill piping. When the fish D presents an upper end similar to that shown in D', there is danger of one of the slips 18 dropping inside of the drill pipe as illustrated in Fig. 16 so that when the tool is lowered over the drill pipe the slip or its connector might be broken. To avoid this an accessory is provided as illustrated in Figs. 14 and 15 consisting of a plate 40 recessed as at 41 to accommodate the upper ends of the springs 22. To the backs of these recesses there are drilled and taped holes adapted to receive studs or arms 42 that can be screwed into the drilled and taped holes through the upper ends of the slots 23 and through notches 43 in the upper ends of the springs. This plate has a central aperture 44 for the passage of circulation fluid therethrough. The aperture 44, however, is comparatively small as compared with the diameter of the plate. The plate serves as a stop, limiting the extent to which the fishing tool may be lowered over the end D' of the fish so that danger of breaking the slip that may have entered the fish is eliminated. If the tool is lowered into the well over a fish as illustrated in Fig. 16, and due to the jagged end thereof the slips are incapable of gripping the fish before the upper end of the fish has engaged plate 40, the tool is then withdrawn from the well and the seal 37 and the milling tool 34 are replaced with an end mill 45 and a spacing ring 46. The tool is then lowered into the well as shown in Fig. 17 and on rotation thereof the jagged end D' is milled off as indicated in this figure. Thereafter the tool is withdrawn and the seal 37 and milling tool 34 may then be reinstalled and the device lowered into the well to recover the fish as indicated in Fig. 18.

From the above described construction it will be appreciated that the improved fishing tool is quite versatile in that a number of different operations may be performed thereby to effect a recovery of the fish from the well. Precautionary measures are provided for protecting the tool in the event that the fish has a jagged end such as that illustrated at D'. The connection between the slips and the liner or sleeve 20 is such as to permit these slips to readily descend and contract into gripping engagement with the fish but at the same time the contraction is such that accidental loosening or dropping of the slips or connectors is impossible inasmuch as these parts cannot assume positions required for their separation while they are assembled within the outer tubular body 10.

Various changes may be made in the details of construction without departing from the spirit or scope of the invention as defined by the appended claims.

I claim:
1. In a wall hook or similar fishing tool, an outer tubular body having internal slipways, a liner having a bayonet joint connection therewith, slips adapted to be contracted into engagement with the fish when moved relatively to the slipways, and connectors connecting the slips to the liner, the connectors having hooked ends and the slips and liners having slots equal in width to the width of the hooks but less than the height of the crooks of the hooks.

2. In a fishing tool, a tubular body having internal slipways therein, a liner in the body, said liner having angular slots therein, studs in the body extending into the slots, bowed friction springs on the interior of the liner overlying said slots, and slips suspended from the liner adjacent the slipways, the upper ends of the friction springs being slotted to receive studs of a stop plate to limit upward movement of a fish within the body, and a stop plate having studs receivable in the slots of the friction springs.

3. In a fishing tool, a tubular body having internal slipways therein, a liner in the body, said liner having angular slots therein, studs in the body extending into the slots, bowed friction springs on the interior of the liner overlying said slots, slips suspended from the liner adjacent the slipways, the upper ends of the friction springs being slotted to receive studs of a stop plate serving to limit upward movement of a fish within the body, a stop plate having studs receivable in the slots of the friction springs, there being an internal shoulder on the body overlying the studs on the stop plate.

4. In a fishing tool, a tubular body having internal slipways therein, slips movable on the slipways adapted to move downwardly thereon to contract about a fish, means for suspending the slips within the body and connectors connecting the slips to the suspending means, said connectors having hooked ends, and the slips and suspending means having slots equal in width to the widths of the hooks but less than the height of the crooks of the hooks.

CLARENCE P. YOUNG.